UNITED STATES PATENT OFFICE.

RUDOLPH BERENDES AND JÜRGEN CALLSEN, OF ELBERFELD, GERMANY, ASSIGNORS TO FARBENFABRIKEN VORM. FRIEDR. BAYER & CO., OF ELBERFELD, GERMANY, A CORPORATION OF GERMANY.

SUCCINYL-DISALICYLIC ACID.

No. 874,929.     Specification of Letters Patent.     Patented Dec. 31, 1907.

Application filed July 22, 1907. Serial No. 385,046. (Specimens.)

*To all whom it may concern:*

Be it known that we, RUDOLPH BERENDES and JÜRGEN CALLSEN, doctors of philosophy, chemists, citizens of the German Empire, residing at Elberfeld, Germany, Kingdom of Prussia, have invented new and useful Improvements in Succinyl-Disalicylic Acid, of which the following is a specification.

Our invention relates to the preparation of the hitherto unknown succinyl-disalicylic acid having the formula:

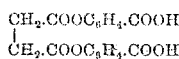

which can be prepared by treating salicylic acid or its salts with the acid dihalogenids of succinic acid.

The succinyl-di-salicylic acid is a valuable therapeutic compound. It is almost tasteless and non-irritant and is more easily split up and better absorbed than the known acidylized derivatives of salicylic acid frequently administered as substitutes for salicylic acid. It has also proved to be a stronger diaphoretic than these substances. It is to be prescribed or taken in similar doses as sodium salicylate or acetyl salicylic acid, an average dose being about one gram.

In order to illustrate our invention we give the following example, the parts being by weight: 155 parts of succinyl chlorid are slowly added to a solution of 276 parts of salicylic acid in 500 parts of benzene and 300 parts of dimethylanilin. The addition of the succinyl chlorid is best carried out at a temperature of about 20° C. The mixture is allowed to stand for some hours. It is then poured into water and an excess of HCl is added thereto. The succinyl-di-salicylic acid separates on stirring for a short time as a solid body, its precipitation is accelerated by the addition of ligroin. It is filtered off, washed with water and recrystallized from glacial acetic acid or alcohol. The new compound forms a crystalline powder melting at about 178–180° C. It is odorless and almost tasteless, soluble with difficulty in cold alcohol and glacial acetic acid and scarcely soluble in water. On boiling the succinyl-di-salicylic acid with water or with alkalies it is decomposed, succinic acid and salicylic acid being formed.

The following equation illustrates the reaction which takes place:

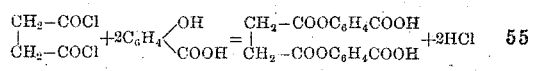

The new succinyl salicylic acid possesses the property of forming salts with many metals, for example: the alkaline metals; the hydrogen of the carboxyl groups being replaced by the metal. In this manner either neutral or acid salts may be obtained. The new acid may also form salts with organic bases, such as: hexamethyl-entetramin These salts represent the usual addition products of 1 molecule of the acid and 1 or 2 molecules of the base. All these salts have substantially the same therapeutic effect.

The process is carried out in an analogous manner on using instead of salicylic acid salts of salicylic acid; but in the case of salts there is no necessity of adding dimethylanilin. Furthermore succinyl chlorid may be replaced by succinyl bromid and dimethyl anilin by other bases such as diethyl anilin, quinolin etc., capable of fixing the halogen hydrogens.

Having now described our invention and in what manner the same is to be performed, what we claim as new and desire to secure by Letters Patent is:—

The herein-described new succinyl-di-salicylic acid obtainable by the action of the acid dichlorid of succinic acid upon salicylic acid, which in the acid form is a white crystalline powder melting at 178–180° C., soluble with difficulty in cold alcohol and glacial acetic acid, scarcely soluble in water and which by heating with caustic alkalies is decomposed into succinic acid and salicylic acid, forming salts with bases which retain the valuable therapeutic properties exhibited by the acid, substantially as hereinbefore described.

In testimony whereof we have hereunto set our hands in the presence of two subscribing witnesses.

RUDOLPH BERENDES. [L. S.]
JÜRGEN CALLSEN. [L. S.]

Witnesses:
OTTO KÖNIG,
OSKAR KLUG.